United States Patent Office 3,849,400
Patented Nov. 19, 1974

3,849,400
2-(SUBSTITUTED ANILINO)-4,5-DIHYDRO-3H-1,3-BENZODIAZEPINES
John T. Suh, 3709 W. Scenic Drive, 111 N., Mequon, Wis. 53092, and Richard A. Schnettler, 6234 W. Donges Lane, Brown Deer, Wis. 53223
No Drawing. Filed June 30, 1972, Ser. No. 268,127
Int. Cl. C07d 53/04
U.S. Cl. 260—239 BD
10 Claims

ABSTRACT OF THE DISCLOSURE

The 2-(substituted anilino)-4,5-dihydro-3H-1,3-benzodiazepines and their pharmaceutically acceptable acid addition salts are antihypertensive agents. Compounds disclosed are 2-(2,6-dichloroanilino)-4,5-dihydro-3H-1,3-benzodiazepine and 2-(2-trifluoromethylphenyl)-4,5-dihydro-7,8-dimethoxy-3H-1,3-benzodiazepine.

DETAILED DESCRIPTION

The compounds of the present invention have the following formula

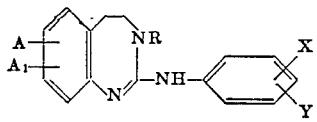

in which A, $A_1$, X and Y are selected from hydrogen, hydroxy, halogen, $CF_3$, alkyl of 1 to 4 carbon atoms, or alkoxy of 1 to 4 carbon atoms, especially methoxy, and R is hydrogen or lower alkyl of 1 to 4 carbon atoms.

BACKGROUND OF THE INVENTION

U.S. Pat. No. 3,496,179 discloses 2-amino-3,4-dihydroquinazolines which are antihypertensive agents and an article by H. R. Rodriguez, et al., *J. Org. Chem.*, 33, 670 (1968) discloses the compound 2-amino-4,5-dihydro-7,8-dimethoxy-3H-1,3-benzodiazepine. Other patents of possible interest are British Pat. No. 1,183,135, German Pat. No. 1,947,062 and U.S. Pat. Nos. 3,474,090 and 3,157,642.

PREPARATION OF THE COMPOUNDS

The compounds of the present invention are readily prepared from β-(2-aminophenyl)ethylamines of the formula

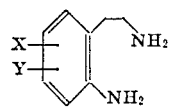

which are known compounds.

Representative of the amines that may be used as starting materials are the following:

β-(2-aminophenyl)ethylamine,
β-(2-amino-4,5-dimethoxyphenyl)ethylamine,
β-(2-amino-4,6-dimethoxyphenyl)ethylamine,
β-(2-amino-4,5-dichlorophenyl)ethylamine,
β-(2-amino-3,6-dichlorophenyl)ethylamine,
β-(2-amino-4,5-ditrifluoromethylphenyl)ethylamine, and
β-(2-amino-4,5-dimethylphenyl)ethylamine.

The compounds of the invention are conveniently prepared by reacting the selected β-(2-aminophenyl)ethylamine with a phenylisocyanide dichloride at room temperature with stirring to form the desired 2-anilino-4,5-dihydro-3H-1,3-benzodiazepine. The process is described in detail in the examples.

The described process may be illustrated as follows:

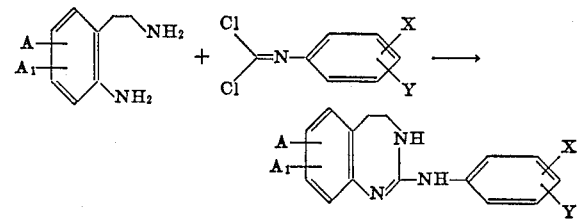

in which A, $A_1$, X and Y are as previously defined.

Representative of the phenylisocyanide dichlorides which may be employed in the described process are the following:

phenylisocyanide dichloride,
2,6-dichlorophenylisocyanide dichloride,
2-trifluoromethylphenylisocyanide dichloride,
4-chlorophenylisocyanide dichloride,
3-fluorophenylisocyanide dichloride, and
5-methoxyphenylisocyanide dichloride.

Among the compounds which may be prepared by the described process are the following:

2-(2,6-dichloroanilino)-4,5-dihydro-7,8-dimethoxy-3H-1,3-benzodiazepine,
2-(4-chloroanilino)-4,5-dihydro-7,8-dimethoxy-3H-1,3-benzodiazepine hydrochloride,
2-(2-trifluoromethylphenyl)-4,5-dihydro-7,8-dimethoxy-3H-1,3-benzodiazepine,
2-(2,6-dichloroanilino)-4,5-dihydro-3H-1,3-benzodiazepine,
2-(2-trifluoromethylanilino)-4,5-dihydro-3H-1,3-benzodiazepine,
2-(3,4-dimethoxyanilino)-4,5-dihydro-3H-1,3-benzodiazepine, and
2-(2,6-diethylanilino)-4,5-dihydro-3H-1,3-benzodiazepine.

The compounds in which A and/or $A_1$ are hydroxy may be readily prepared from the corresponding compounds in which A and $A_1$ are aralkoxy or alkoxy by conventional procedures.

Acid addition salts of the compounds of the present invention may be conveniently produced by contacting the free base form of the compounds with a suitable acid such as sulfuric acid, hydrochloric acid, succinic acid, tartaric acid, benzoic acid or fumaric acid.

The thiocyanic acid addition salts of the compounds, when condensed with formaldehyde, form resinous materials useful as pickling agents according to U.S. Pats. Nos. 2,425,320 and 2,606,155. The compounds also form fluosilicic acid addition salts which are useful as mothproofing agents according to U.S. Pats. Nos. 1,915,334 and 2,075,359.

The compounds of the invention are pharmacologically active. For example, the compounds 2-(2,6-dichloroanilino)-4,5-dihydro-3H-1,3-benzodiazepine and 2 - (2,6-dichloroanilino)-4,5-dihydro - 7,8 - dimethoxy-3H-1,3-benzodiazepine, when evaluated in mouse behavioral studies at intraperitoneal doses of about 10 mg./kg., were found to produce behavioral profiles resembling those of known central nervous system depressants. The mouse behavioral studies also indicated that the compounds were relatively safe and possessed $LD_{50}$'s in excess of 100 mg./kg. of body weight. The behavioral studies were conducted essentially in accordance with the procedure outlined by S. Irwin in "Animal and Clinical Pharmacologic Techniques in Drug Evaluation," J. H. Nodine and P. E. Siegler, Ed., Year Book Medical Publishers, Inc. 1964.
In addition, in the standard anesthetized, vagotomized cat test the forementioned compounds were found at intravenous doses of 10 mg./kg. to cause a substantial decrease in the blood pressure of the animals.

When intended for pharmaceutical use, the compounds are preferably combined with one or more suitable pharmaceutical diluents and additives and formed into unit dosage forms for oral or parenteral administration such as tablets, capsules and solutions.

The following examples are presented to illustrate this invention:

EXAMPLE 1

2-(2,6-Dichloroanilino)-4,5-dihydro-7,8-dimethoxy-3H-1,3-benzodiazepine

In 150 ml. of tetrahydrofuran (THF) there is suspended 6.51 g. (0.0289 mole) of β-(2-nitro-4,5-dimethoxyphenyl)ethylamine and 0.3 g. of platinum oxide. The mixture is shaken with hydrogen until the theoretical amount of gas is taken up. The resulting solution is filtered and the catalyst rinsed with 100 ml. dry benzene. The combined filtrates are then dried with sodium sulfate, filtered, and placed in a one liter three neck reaction flask. The solution is cooled to 10° C. and 3.52 g. (0.0145 mole) 2,6-dichlorophenylisocyanide dichloride is added dropwise over a five minute period. The reaction is allowed to warm to room temperature and is stirred for nine hours. A solid forms, β-(2-amino-4,5-dimethoxyphenyl)ethylamine hydrochloride, which is filtered from the solution. The solvent is evaporated and a brown oil is obtained which is chromatographed over silica gel (CHf:EtOH; 9.5:0.5) to give a white solid. A sample of the solid is recrystallized to give 2-(2,6-dichloroanilino) - 4,5 - dihydro-7,8-dimethoxy-3H-1,3-benzodiazepine in the form of white needles, m.p. 191–192°.

*Analysis.*—Calcd. for $C_{17}H_{17}N_3Cl_2O_2$: C, 55.74; H, 4.68; N, 11.47. Found: C, 55.54; H, 4.44; N, 11.18.

EXAMPLE 2

2-(2,6-Dichloroanilino)-4,5-dihydro-3H-1,3-benzodiazepine

In 50 ml. dry benzene 5.0 g. (0.0368 mole) of β-(2-aminophenyl)ethylamine and 8.95 g. (0.0368 mole) of 2,6-dichlorophenyl isocyanide dichloride are dissolved. The mixture is stirred at room temperature for 15 hours and the solvent evaporated. The residue is suspended in ethyl acetate and washed with 10% sodium hydroxide solution and water. The ethyl acetate solution is extracted with 6N hydrochloric acid solution, neutralized with sodium hydroxide to pH 10, and extracted with ethyl acetate, washed with water and dried. Evaporation of the solvent gives an oil which is chromatographed over 150 g. silica gel (CHf:$C_6H_6$:IsOH; 5:4:0.2) to give 2-(2,6-dichloroanilino)-4,5-dihydro-3H-1,3-benzodiazepine as a solid, m.p. 191–192°.

*Analysis.*—Calcd. for $C_{15}H_{13}N_3Cl_2$: C, 58.83; H, 4.28; N, 13.72. Found: C, 58.83; H, 4.26; N, 13.38.

EXAMPLE 3

2-(2-Trifluoromethylanilino)-4,5-dihydro-7,8-dimethoxy-3H-1,3-benzodiazepine

In 200 ml. dry THF there is suspended 20.0 g. (0.0885 mole) of β-(2-nitro-4,5-dimethoxyphenyl)ethylamine and 0.2 g. of platinum dioxide. The mixture is shaken with 50 p.s.i. hydrogen until gas ceases to be taken up (95% of theory is taken up). The system is filtered and the black solution treated with sodium sulfate and darco. The material is filtered and solvent evaporated to given an amber oil of β-(2-amino-4,5-dimethoxyphenyl)ethylamine. In 150 ml. benzene there is dissolved 13.0 g. (0.0665 mole) of β-(2-amino-4,5-dimethoxyphenyl)ethylamine and the solution cooled to 0° C. in an icebath. 2-Trifluoromethylphenylisocyanide dichloride (16.0 g., 0.0665 mole) is added dropwise to the cooled solution over a 15 minute period. The mixture is allowed to stir 8 hours at room temperature, at which time a solid forms which is filtered and washed with benzene. The solid is suspended in 10% sodium hydroxide and extracted into ethyl acetate, washed with water, and dried. Evaporation of the solvent affords an oil which is chromatographed over 200 g. silica gel (CHf:Is-OH; 9:1). Fractions of 150 ml. are collected and fractions 6–12 yield a white solid which is crystallized from isopropanol to give 2-(2-trifluoromethylanilino)-4,5-dihydro - 7,8 - dimethoxy-3H-1,3-benzodiazepine as white crystals, m.p. 174–176° C.

*Analysis.*—Calcd. for $C_{18}H_{18}N_3F_3O_2$: C, 59.17; H, 4.99; N, 11.50. Found: C, 59.21; H, 4.94; N, 11.31.

EXAMPLE 4

2-(2-Trifluoromethylanilino)-4,5-dihydro-3H-1,3-benzodiazepine

In 50 ml. chilled benzene there is dissolved 5.0 g. (0.0368 mole) of β-(2-aminophenyl)ethylamine to which is rapidly added 8.87 g. (0.0368 mole) 2-trifluoromethylphenylisocyanide dichloride. The mixture is stirred at room temperature for four hours, cooled, and the solid collected. The solid is basified with 10% sodium hydroxide and extracted into ethyl acetate, washed with water, and dried. The solvent is evaporated and the residue chromatographed over 150 g. silica gel (CHf:EtOH; 9:1) to give 2-(2 - trifluoromethylanilino)-4,5-dihydro-3H-1,3-benzodiazepine as a white solid which is recrystallized from isopropanol, m.p. 204–205° C.

*Analysis.*—Calcd. for $C_{16}H_{14}N_3F_3$: C, 62.94; H, 4.62; N, 13.76. Found: C, 62.90; H, 4.58; N, 13.75.

EXAMPLE 5

2-(4-Chloroanilino)-4,5-dihydro-7,8-dimethoxy-3H-1,3-benzodiazepine

In 100 ml. THF there is dissolved 8.93 g. (0.0395 mole) of β-(2-nitro-4,5-dimethoxyphenyl)ethylamine and 0.3 g. of platinum dioxide. The mixture is shaken with hydrogen until the theoretical volume of gas is taken up. The solution is filtered and the catalyst rinsed with 100 ml. benzene. The filtrate is dried over sodium sulfate, filtered, and cooled to 10° C. in an icebath. Over a period of five minutes there is slowly added 8.26 g. (0.0395 mole) p-chlorophenylisocyanide dichloride. The mixture is allowed to warm to room temperature and stirred 15 hours. The solvent is evaporated and the residue triturated with ethyl acetate:isopropanol to give 2-(4-chloroanilino)-4,5-dihydro-7,8-dimethoxy-3H-1,3-benzodiazepine as a white solid which is recrystallized three times from isopropanol, m.p. 236–237° C.

*Analysis.*—Calcd. for $C_{17}H_{18}N_3O_2Cl_2$: C, 55.44; H, 5.20; N, 11.41. Found: C, 55.49; H, 5.28; N, 11.16.

We claim:

1. A compound selected from a compound of the formula

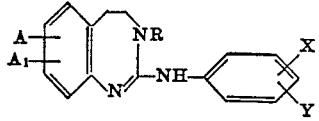

and pharmaceutically acceptable salts thereof, wherein A, $A_1$, X and Y are selected from hydrogen, hydroxy, halogen, trifluoromethyl, alkyl of 1 to 4 carbon atoms or alkoxy of 1 to 4 carbon atoms, and R is hydrogen or lower alkyl of 1 to 4 carbons.

2. A compound of claim 1 in which A and $A_1$ are methoxy.

3. A compound of claim 1 in which X and Y are hydrogen.

4. A compound of claim 1 in which A and $A_1$ are methoxy and R, X and Y are hydrogen.

5. The compound of claim 1 in which A, $A_1$, R and X are hydrogen and Y is 2-trifluoromethyl.

6. The compound of claim 1 in which A, $A_1$ and R are hydrogen, X is 2-chloro and Y is 6-chloro.

7. The compound of claim 1 in which A is 7-methoxy, $A_1$ is 8-methoxy, R and X are hydrogen and Y is 2-trifluoromethyl.

8. The compound of claim 1 in which A is 7-methoxy, $A_1$ is 8-methoxy and R, X and Y are hydrogen.

9. The compound of claim 1 in which A is 7-methoxy, $A_1$ is 8-methoxy, R and X are hydrogen and Y is 4-chloro.

10. The compound of claim 1 in which R is hydrogen, A is 7-methoxy, $A_1$ is 8-methoxy, X is 2-chloro and Y is 6-chloro.

References Cited

UNITED STATES PATENTS

| 3,496,179 | 2/1970 | Hess | 260—256.4 Q |
| 3,681,340 | 8/1972 | Rodriguez et al. | 260—239 BD |

ALTON D. ROLLINS, Primary Examiner

U.S. Cl. X.R.

252—149; 260—566 D, 570.9; 424—244